(12) United States Patent
Miho et al.

(10) Patent No.: US 6,223,395 B1
(45) Date of Patent: May 1, 2001

(54) RETRACTABLE ASSIST GRIP

(75) Inventors: Sugumune Miho; Hozumi Noda, both of Hiroshima (JP)

(73) Assignee: Nishikawa Kasel Co., Ltd., Hiroshima (JP)

( * ) Notice: Subject to any disclaimer, the term of this patent is extended or adjusted under 35 U.S.C. 154(b) by 0 days.

(21) Appl. No.: 09/438,583

(22) Filed: Nov. 12, 1999

(30) Foreign Application Priority Data

Jun. 17, 1999 (JP) .................................................. 11-170454

(51) Int. Cl.[7] ............................. A45C 13/22; A45C 13/26
(52) U.S. Cl. .................................. 16/429; 16/445; 16/438
(58) Field of Search ........................... 16/429, 412, 438,
16/444, 445, 50, 54, 342, 82; 188/290;
296/214, 39.1

(56) References Cited

U.S. PATENT DOCUMENTS

| | | | |
|---|---|---|---|
| 4,694,530 | * 9/1987 | Foggini ....................................... 16/82 |
| 4,842,106 | * 6/1989 | Ludwig ................................. 188/290 |
| 4,893,522 | * 1/1990 | Arakawa ............................... 188/290 |
| 5,743,575 | * 4/1998 | McFarland ........................ 16/DIG. 6 |
| 5,855,408 | * 1/1999 | Rickabus ................................ 16/438 |
| 5,920,957 | * 7/1999 | Wagner ................................. 16/438 |
| 6,048,125 | * 4/2000 | Droche et al. ......................... 16/444 |

FOREIGN PATENT DOCUMENTS 5-96982   4/1993 (JP) .
9-263166  10/1997 (JP) .

* cited by examiner

*Primary Examiner*—Chuck Y. Mah
(74) *Attorney, Agent, or Firm*—Eric J. Robinson; Nixon Peabody LLP

(57) ABSTRACT

In a retractable assist grip in which a grip body rotatably supported on a mount is urged into swing motion from the use position to the retracted position, one side surface of a supporting part of the mount is formed integrally with s fulcrum pin extending therefrom. A pin support of a leg of the grip body is journaled on the fulcrum pin. On the other side surface of the supporting part, a recess and a loose-fit pin extending inside the recess from the bottom of the recess are formed coaxially with the fulcrum pin. The leg of the grip body is assembled against relative rotation with a spacer rotatably inserted into the recess and including a pin loose-fitting part for loosely receiving the loose-fit pin therein. A viscidity L is provided between the outer periphery of the spacer and the inner periphery of the recess of the mount, thereby forming a damper. This structure not only slows down the swing motion of the assist grip to the retracted position by means of the damper in which a high-viscosity viscidity is encapsulated, but also reduces the number of components of the assist grip thereby resulting in cost reduction.

3 Claims, 16 Drawing Sheets

RETRACTABLE ASSIST GRIP

FIELD OF THE INVENTION

This invention relates to a retractable assist grip for a car body, which is retracted from its use position to its retracted position when it is not in use, and particularly relates to pivotal type one which is retractable so as to be swung to its retracted position.

DESCRIPTION OF THE PRIOR ART

There is known a conventional retractable assist grip of such kind, for example, as disclosed in Japanese Patent Application Laid-Open Gazette No. 9-263166. In this case, respective pairs of extensions are provided on each leg of a U-shaped grip body and each corresponding part of a car body, and one pair of extensions, extending from one of the legs of the grip body or the corresponding part of the car body, are interposed between the other pair of extensions. In addition, coaxial holes are formed over the two pairs of extensions, and a damper, which is formed of an outer cylinder and an inner pin inserted into the outer cylinder and in which a high-viscosity viscidity is encapsulated, is inserted into the coaxial holes. And, the outer cylinder and the inner pin of the damper are fixed to the two pairs of extensions, one located on the grip body side and the other located on the car body side, respectively. Thus, when the grip body is swung from use to retracted position, it is urged against the swing motion by the viscosity of the viscidity in the damper thereby reducing its swinging speed.

When the swing motion of the grip body toward the retracted position is slowed down in the above manner, the grip body slowly moves from use to retracted position. Therefore, it is prevented that the grip body immediately moves to the retracted position and hits the car body hard to cause a beating sound. This provides a desired upscale image to the assist grip.

As another example of conventional pivotal type retractable assist grips, there is known an assist grip in which one leg of the grip body is supported to a bearing member through a support pin, as disclosed in Japanese Patent Application Laid-Open Gazette No. 5-96982. In this assist grip, the support pin is contacted with a frictional brake made of viscoelastic resin material. When the grip body is swung from use to retracted position, it is given sliding resistance by the frictional brake thereby reducing its swinging speed.

The former conventional example (Japanese patent Application Laid-Open Gazette No. 9-263166) can provide improved quality appearance and durability. However, in this example, since the damper formed of the outer cylinder and the inner pin is fitted as a pin into holes through the pairs of extensions of the grip body and the car body, the number of components forming the damper mechanism becomes increased, which invites a rise in cost.

On the other hand, in the latter conventional example (Japanese Patent Application Laid-Open Gazette No. 8-96982), it is necessary to provide, in the bearing member, a frictional brake for contacting the support pin therewith. This increases the number of components for the damping mechanism. In addition, since the swing motion of the grip body is damped by sliding resistance, this makes it difficult to give an upscale image to the swing motion and may cause a drop in durability due to friction.

An object of the present invention is to improve a damper mechanism of a pivotal type retractable assist grip that uses a damper in which a high-viscosity viscidity is encapsulated, and more specifically not only to slow down the swing motion of the assist grip to its retracted position by an excellent damping effect of the damper in which the viscidity is encapsulated but also to reduce the number of components of the assist grip thereby resulting in cost reduction.

SUMMARY OF THE INVENTION

To achieve the above object, in the present invention, an assist grip is configured such that a damper, in which the above-mentioned high-viscosity viscidity is encapsulated, is incorporated together with the grip body and a mount.

Specifically, the present invention is directed to a retractable assist grip including: a mount fixed to a fixed body such as a car body; a grip body pivotally mounted for swing motion at a leg thereof onto the mount; and urging means for urging the grip body into swing motion from its use position to its retracted position.

Further, the mount includes a fulcrum pin extended integrally from one side thereof, a recess formed coaxially with the fulcrum pin on the opposite side of the mount, and a loose-fit pin extended integrally from the inner bottom toward the opening of the recess and coaxially with the fulcrum pin. Furthermore, the leg of the grip body is formed with a pin support journaled on the fulcrum pin. In addition, the leg of the grip body is assembled against relative rotation with a spacer rotatably inserted into the recess of the mount and including a pin loose-fitting part for loosely receiving the loose-fit pin therein, and a viscidity is provided between the outer periphery of the spacer and the inner periphery of the recess of the mount.

With this arrangement, when the grip body swings with respect to the mount, the pin support in the leg of the grip body rotates about the fulcrum pin of the mount and the spacer assembled against relative rotation with the leg of the grip body rotates about the loose-fit pin within the recess of the mount. Since the viscidity is provided between the inner periphery of the recess of the mount and the outer periphery of the spacer, a damper is formed by the mount and the spacer fitted on the grip body side. The viscosity of the viscidity in the damper produces resistance against the rotation of the spacer, so that the grip body can swing slowly. This provides an upscale image to the swing motion.

Further, since the grip body is supported to the mount such that the pin support of the leg of the grip body is journaled on the fulcrum pin of the mount and the spacer fitted on the grip body side is inserted into the recess of the mount, the assist grip can be built up form the urging means, the grip body, the mount and the spacer only. Accordingly, the number of components of the assist grip is reduced than that of the conventional one, which achieves cost reduction. In addition, since the damper is accommodated in the grip body, the appearance of the assist grip can be improved.

The viscidity is preferably also provided between the inner periphery of the pin loose-fitting part of the spacer and the outer periphery of the loose-fit pin of the mount. In this case, when the grip body swings with respect to the mount, resistance against the swing motion produces not only by the viscosity of the viscidity between the inner periphery of the recess of the mount and the outer periphery of the spacer but also by the viscosity of the viscidity between the inner periphery of the pin-loose-fitting part of the spacer and the outer periphery of the loose-fit pin. The increase in resistance against the swing motion resulting from the viscosity of both the parts further increases the damping effect. In addition, since the parts for giving resistance against the swing motion by the viscosity are disposed in two layers around the rotational axis, the axial length of the damper can be shortened correspondingly.

Alternatively, a retractable assist grip of the present invention may be arranged as follows: In the retractable assist grip directed in the above manner, the mount is formed of first and second mounts; a leg of the grip body is assembled into unitary rotation with a fulcrum pin supported to the first mount; the grip body is formed with a spacer fitting part formed of a concavity coaxial with the fulcrum pin, the fulcrum pin extending inside the spacer fitting part toward the opening thereof; the second mount includes a spacer part rotatably fitted into the spacer fitting part and provided with a recess for loosely receiving the fulcrum pin extending inside the spacer fitting part therein; and a viscidity is provided at least between the outer periphery of the spacer part of the second mount and the inner periphery of the spacer fitting part of the grip body.

With this arrangement, when the grip body swings, the fulcrum pin assembled into unitary rotation with the leg of the grip body rotates with respect to the first mount and the grip body rotates around the second mount the spacer part of which is inserted into the spacer fitting part. At the time, since the viscidity is provided between the outer periphery of the spacer part of the second mount and the inner periphery of the spacer fitting part of the grip body, a damper is formed between the spacer part of the second mount and the grip body. The viscosity of the viscidity in the damper produces resistance against the swing motion of the grip body thereby swinging the grip body slowly. This provides an upscale image to the swing motion.

In addition, since the grip body is supported to the two mounts through the fulcrum pin, the assist grip can be built up from the grip body, the fulcrum pin, the two mounts and the urging means only. This reduces the number of components of the assist grip, resulting in cost reduction. Also, since the damper is accommodated in the grip body, the appearance of the assist grip can be improved.

DESCRIPTION OF THE PREFERRED EMBODIMENTS

Embodiment 1

Figure 1:
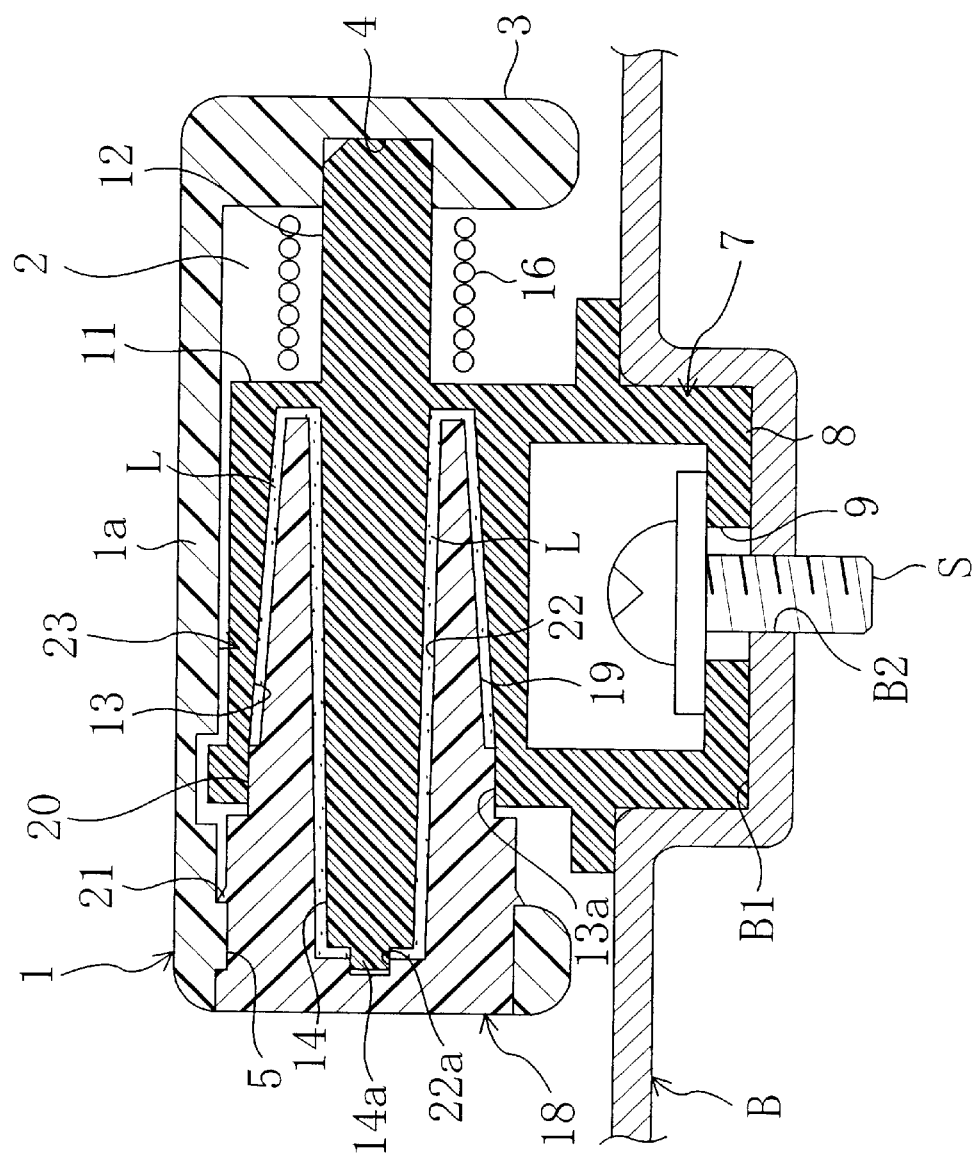
FIG. 1 is an enlarged cross-sectional view taken along the line I—I of FIG. 4.

FIGS. 1 through 5 show a pivotal type retractable assist grip G according to Embodiment 1 of the present invention. As shown in these figures, a grip body 1 is curved approximately in the shape of a bracket and is made of polypropylene (PP) for example. The grip body 1 has a pair of legs 1a, 1a at the lengthwise right and left ends (only right-hand leg is shown in the figures), and is pivoted at the legs 1a, 1a to, for example, a car body (fixed body) B forming a vertical sidewall in a room of a vehicle. The pivoted structure thereof at the legs 1a, 1a allows the grip body 1 to swing between its use position and its retracted position. When the grip body 1 is in the retracted position, the intermediate part thereof directs upwardly to take a position approximately along the vertical plane. On the other hand, when the grip body 1 is in the use position, the intermediate part directs toward the car room to take a position approximately along the horizontal plane.

Specifically, in a state that the grip body 1 is in the retracted position, an accommodating section 2 is formed on the back of each leg 1a (on the side opposed to the car body B) so as to be constituted by a cavity cut out in an approximately rectangular shape upwardly from the bottom surface of the grip body 1. Out of two laterally opposed sidewalls of the accommodating section 2, an outer sidewall located far from the lateral center of the grip body 1 (right-hand sidewall in FIG. 1) is formed into a pin support 3. A bottomed circular support bore 4 is formed in the inside surface of the pin support 3. On the other hand, an inner sidewall of the accommodating section 2, located closer to the lateral center of the grip body 1 (left-hand sidewall in FIG. 1), has a spacer fitting hole 5 having a half-round lower part and a rectangular upper part and formed through the inner sidewall such that the center of the half circle of the lower part is aligned with the center of the support bore 4.

Figure 2:
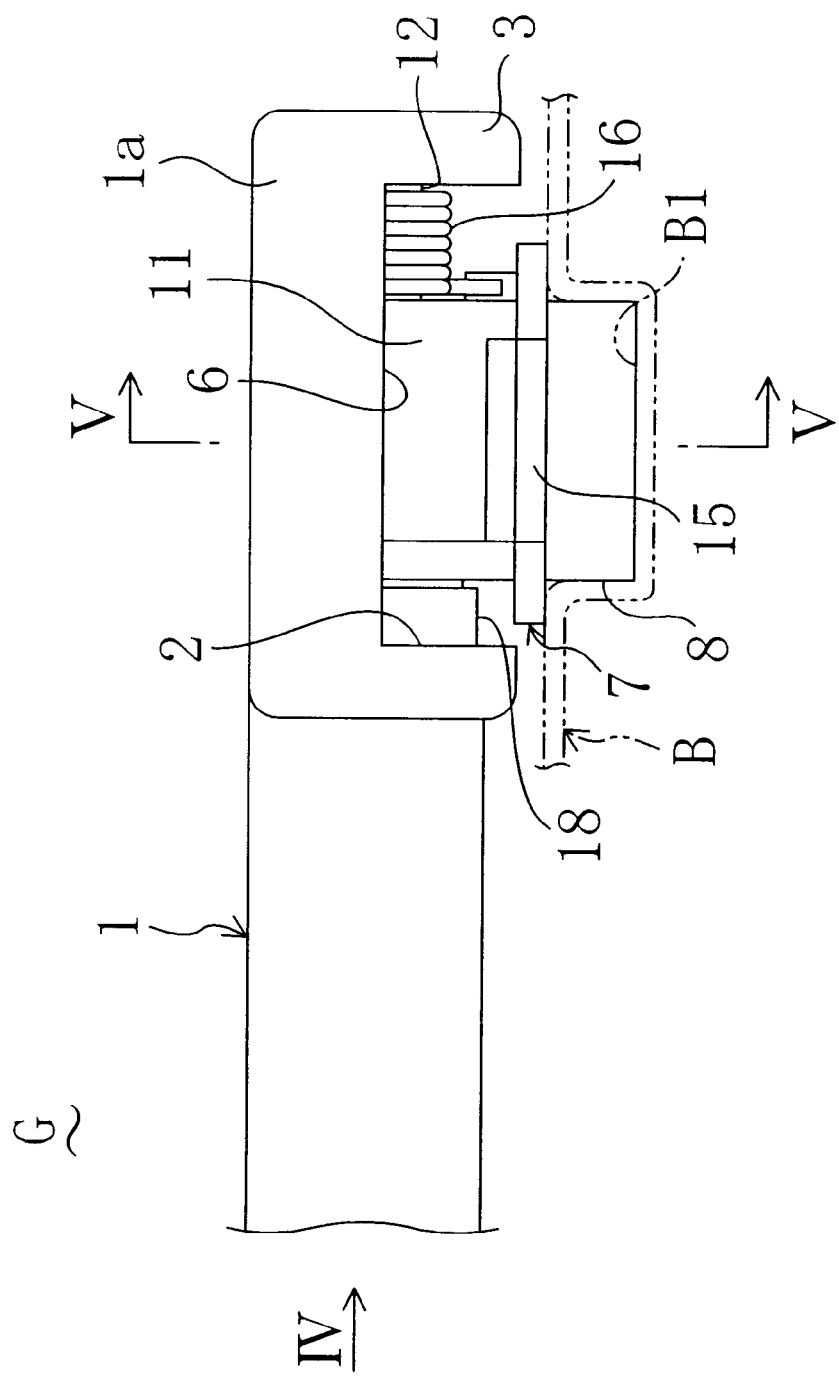
FIG. 2 is a plan view of an essential part of an assist grip according to Embodiment 1 of the present invention as seen from the bottom.
Figure 3:
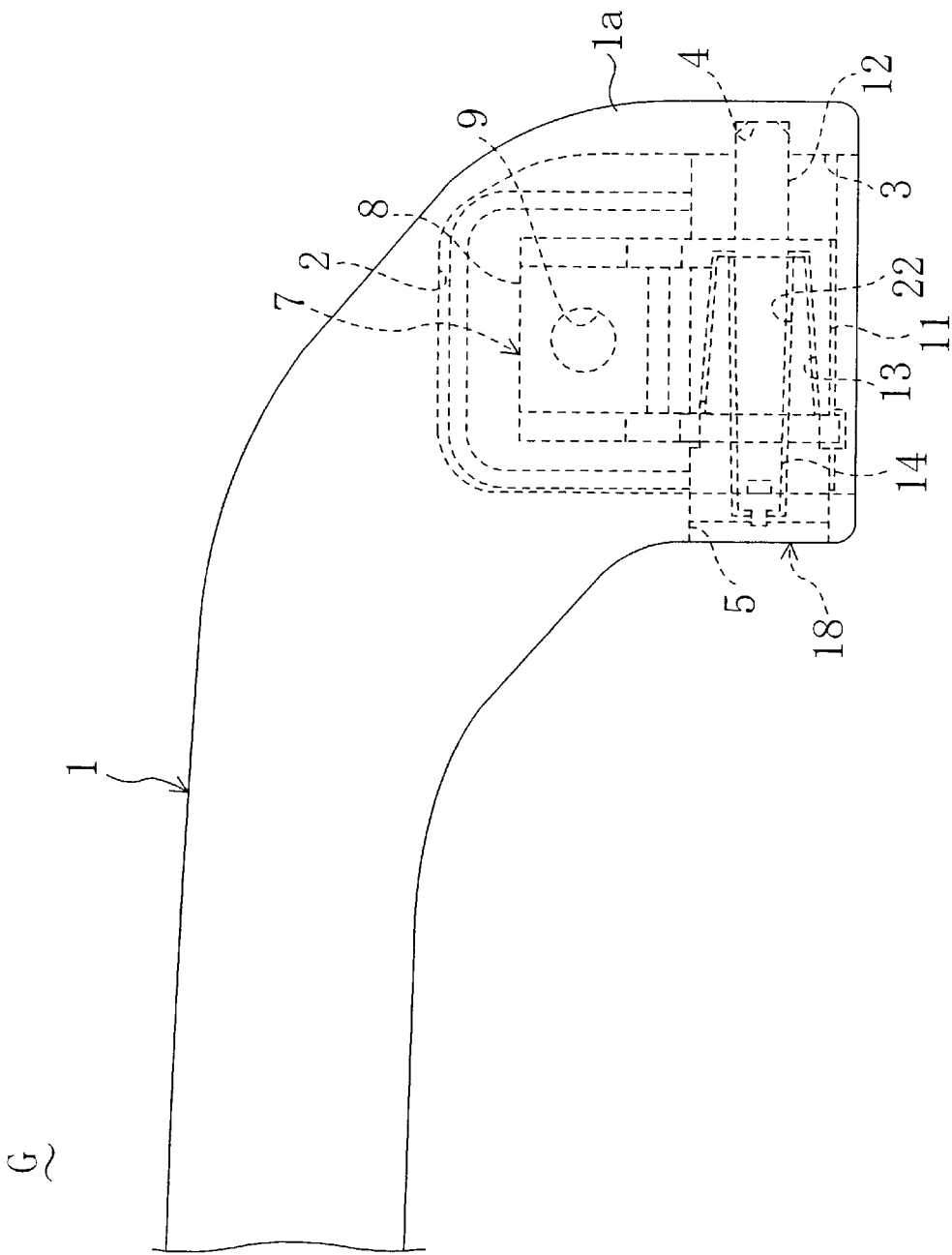
FIG. 3 is a front view of the essential part of the assist grip in FIG. 2.
Figure 4:
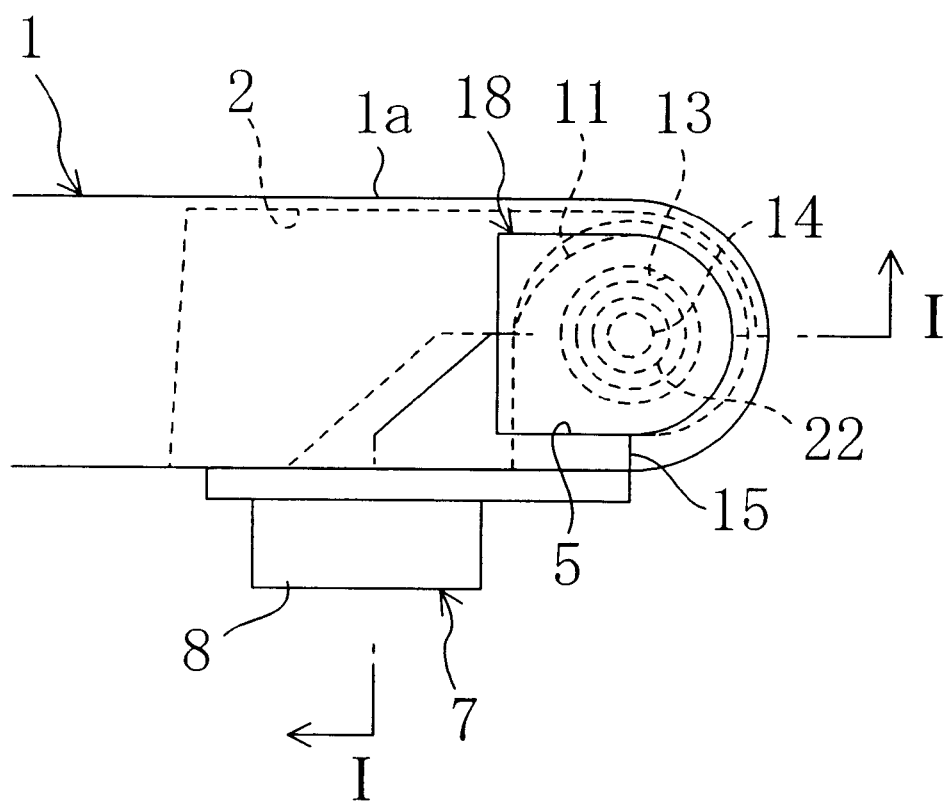
FIG. 4 is a view taken in the direction of the arrow IV of FIG. 2.
Figure 6:
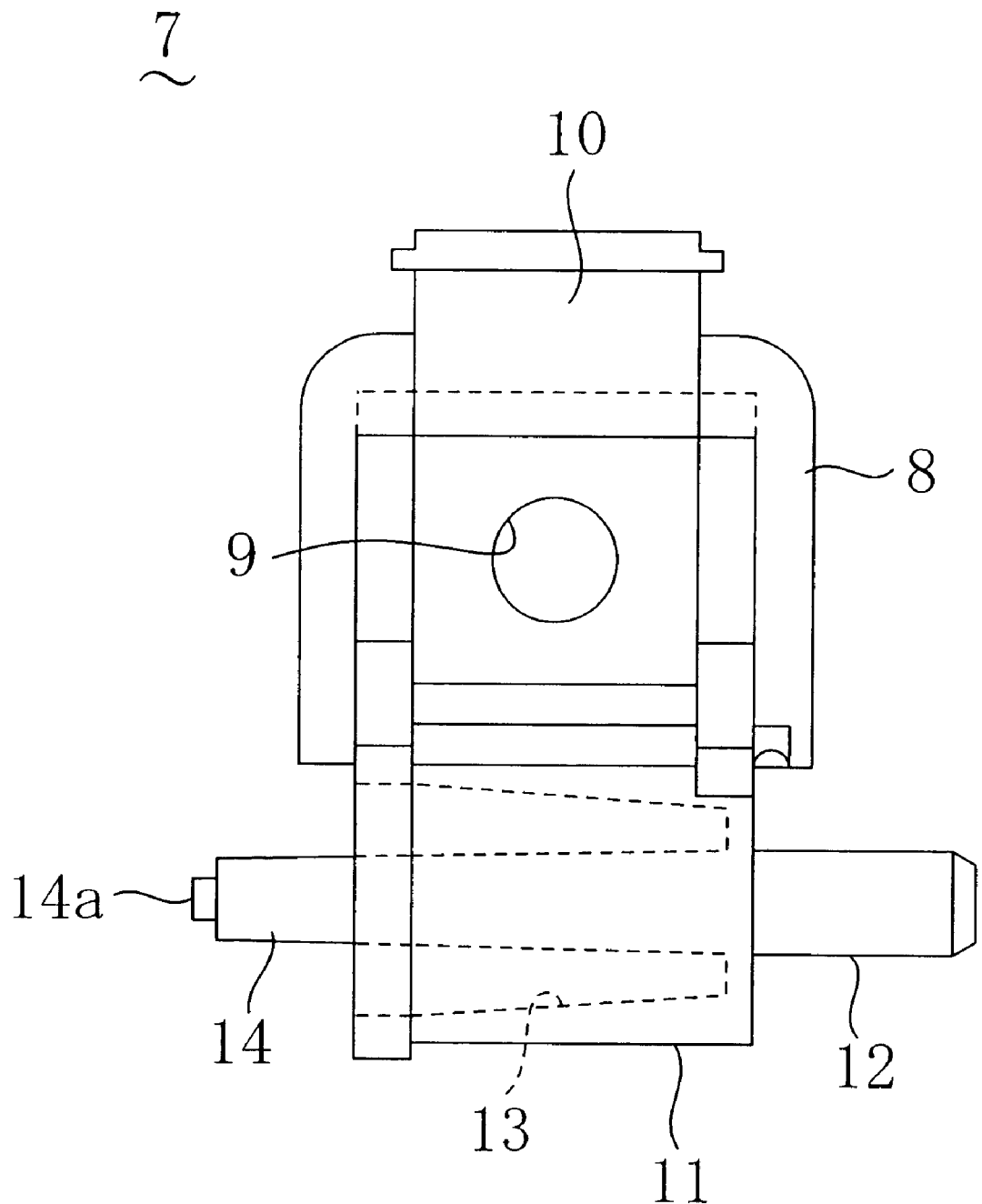
FIG. 6 is an enlarged front view of a mount.
Figure 7:
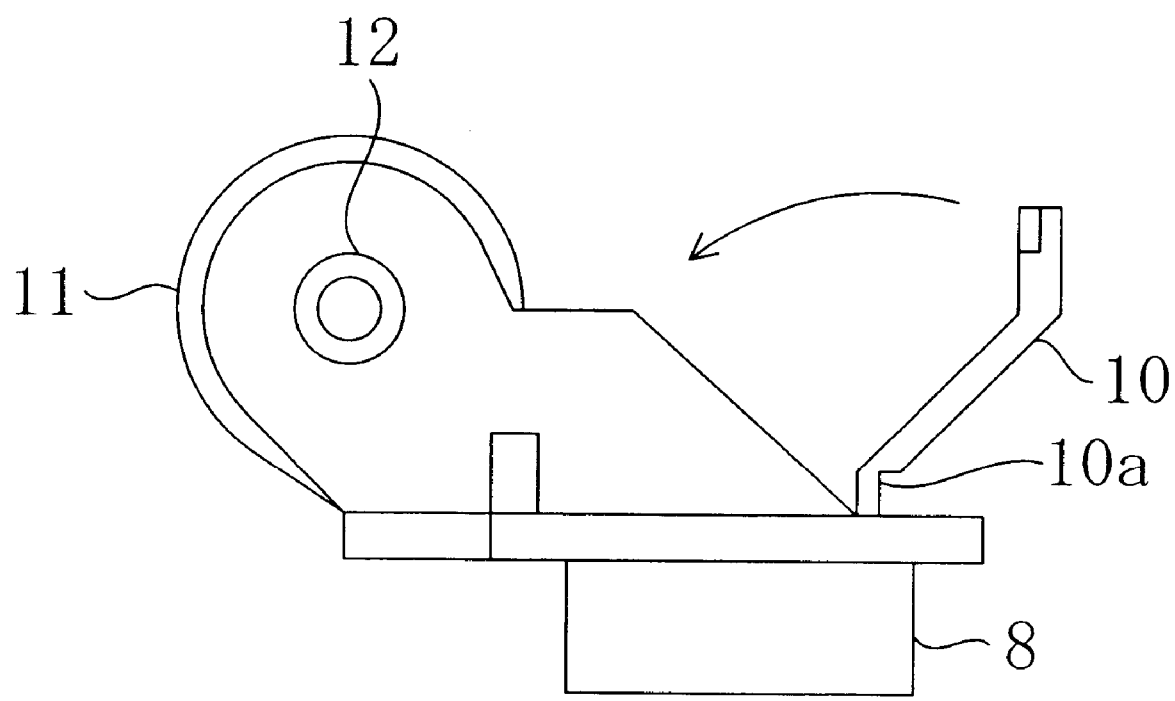
FIG. 7 is an enlarged side view of the mount.
Figure 8:
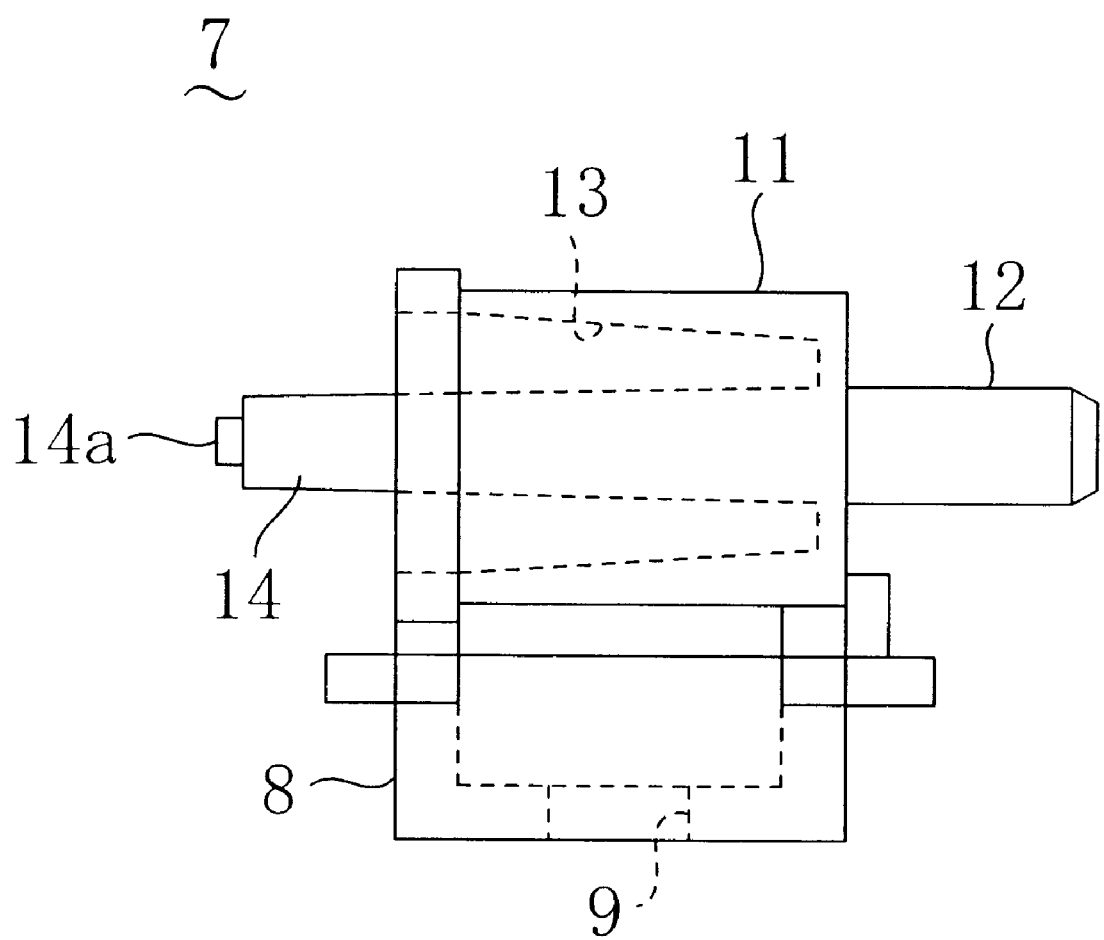
FIG. 8 is an enlarged plan view of the mount.

In the accommodating section 2 of the grip body 1, part of a mount 7, which is made of polyacetal (POM) or the like and secured to the car body B, is disposed and contained. As shown in FIGS. 6 through 8, the mount 7 has a bottomed box-shaped fixing part 8 of rectangular section with a front aperture. The bottom of the fixing part 8 has a screw free-receiving hole 9 formed therethrough. As shown in FIGS. 1 and 2, the mount 7 is fixed to the car body B by fitting the bottom of the fixing part 8 of the mount 7 into a rectangular mounting recess B1 formed in the car body B and threading a screw S, having passed through the screw free-receiving hole 9 at the bottom of the fixing part 8, into a screw hole B2 formed at the bottom of the mounting recess B1. An upper edge of the aperture of the fixing part 8 is provided integrally with a hinged type cover 10 for opening and closing the aperture. The above-mentioned threading work using the screw S is made with the cover 10 open, and thereafter, the cover 10 is closed to cover the aperture of the fixing part 8 thereby hiding the screw S.

At the front side of the fixing part 8 of the mount 7, a supporting part 11 is integrally formed so as to be offset below from the fixing part 8 (on the side opposite to a hinged part 10a of the cover 10). Out of laterally opposite side surfaces of the supporting part 11, one side surface facing the pin support 3 of the grip body 1 is formed integrally with a fulcrum pin 12 extending from the one side surface. On the other side surface of the supporting part 11, a recess 13, formed of a tapered hole diminishing its inner diameter toward the fulcrum pin 12 (toward its bottom), is formed coaxially with the fulcrum pin 12. A tapered loose-fit pin 14 is extended integrally from the bottom of the recess 13 and coaxially with the fulcrum pin 12 to pass the inside of the recess 13 toward the opening 13a thereof. The root end of the tapered loose-fit pin 14 has a diameter substantially equal to that of the fulcrum pin 12. The loose-fit pin 14 extends beyond the opening 13a of the recess 13, and the distal end portion thereof is extended and formed integrally into a small-diameter pivot pin 14a forming a level difference with the remaining portion of the loose-fit pin 14.

As shown in FIG. 1, the distal end portion of the fulcrum pin 12 of the mount 7 is rotatably inserted into the support bore 4 of the pin support 3 in the leg 1a of the grip body 1. Under this configuration, the grip body 1 is supported at the pin support 3 of each leg 1a for swing motion on the fulcrum pin 12 of the mount 7.

A torsion coil spring 16 as an urging means is disposed around the fulcrum pin 12 of the mount 7. The spring 16 is anchored at one end thereof on the pin support 3 of the grip body 1 and at the other end on the fixing part 8 of the mount 7. The grip body 1 is urged into swing motion from the use position toward the retracted position by the torque of the spring 16.

Figure 9:
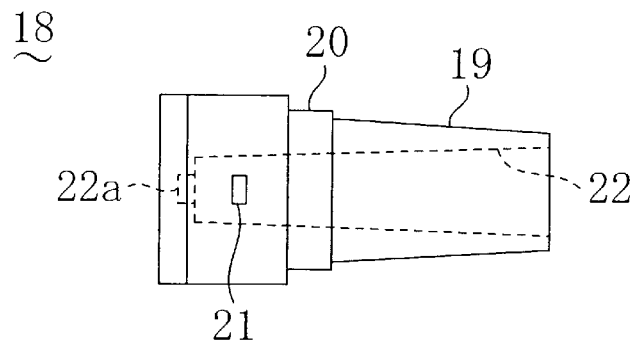
FIG. 9 is an enlarged front view of a spacer.
Figure 10:
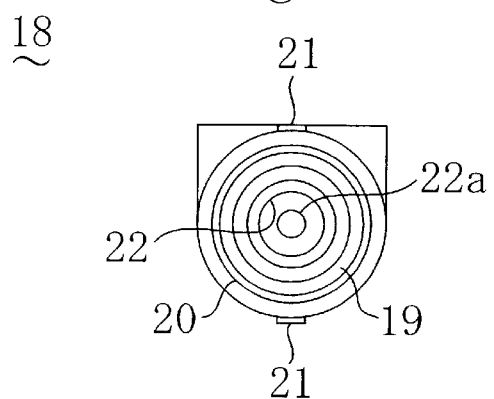
FIG. 10 is an enlarged side view of the spacer.
Figure 11:
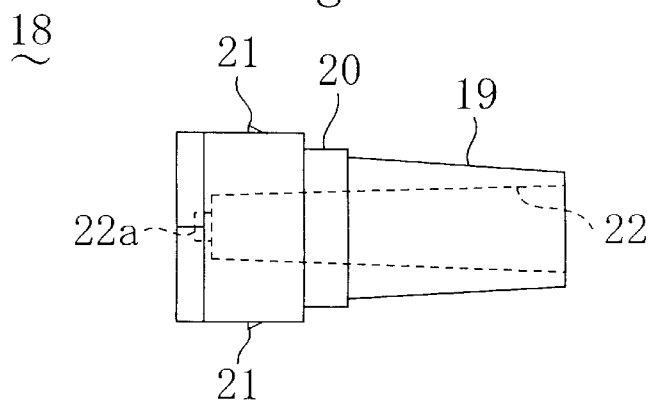
FIG. 11 is an enlarged plan view of the spacer.

A bottomed spacer 18 in substantially cylindrical form is fixedly mounted against rotation in the spacer fitting hole 5 of the leg 1a of the grip body 1. The end portion of the spacer 18 is inserted rotatably in the recess 13 of the mount 7. In detail, as shown in FIGS. 9 through 11, the end portion of the spacer 18 is composed of a tapered insert part 19 and a sealed part 20 of larger diameter extending radially outwardly from the root end of the insert part 19 to form a level difference therebetween. As shown in FIG. 1, when the insert part 19 is inserted into the recess 13 of the mount 7, a substantially uniform clearance is created between the outer periphery of the insert part 19 and the inner periphery of the recess 13. The sealed part 20 can be fitted into the opening 13a of the recess 13 of the mount 7 in liquid-tight manner. The sealed part 20 closes the opening 13a of the recess 13 so as to allow rotation relative to the opening 13a, and seals the clearance between the outer periphery of the insert part 19 and the inner periphery of the recess 13 and a clearance between the inner periphery of the below-described pin loose-fitting part 22 and the outer periphery of the loose-fit pin 14 of the mount 7.

Alternatively, if a sealing member such as an O-ring is interposed between the opening 13a of the recess 13 and the sealed part 20 of the spacer 18 inserted into the opening 13a, the liquid-tight seal between both the members can be further improved.

The root end portion of the spacer 18 has the same contour (half-round at one end and rectangular at the other end) as that of the spacer fitting hole 5. The fitting of the root end portion into the spacer fitting hole 5 holds the spacer 18 against rotation in the spacer fitting hole 5. A pair of clicks 21, 21 protrudes from diametrically opposite positions on the outer periphery of the root end portion of the spacer 18. On inserting the spacer 18 into the spacer fitting hole 5, the clicks 21 are engaged with the inside surface of the leg 1a of the grip body 1 so that the spacer 18 is securely held against movement off from the spacer fitting hole 5.

The spacer 18 is internally formed with the pin loose-fitting part 22 tapered and formed of a bottomed hole extending from the distal end thereof. A bore 22a is formed coaxially at the bottom of the pin loose-fitting part 22. As shown in FIG. 1, the loose-fit pin 14 of the mount 7 is loosely fitted into the pin loose-fitting part 22 so as to allow relative rotation of the spacer 18, and the pivot pin 14a of the loose-fit pin 14 is fitted into the bore 22a. In these fitting conditions, a substantially uniform clearance is created between the outer periphery of the loose-fit pin 14 and the inner periphery of the pin loose-fitting part 22.

The clearance between the outer periphery of the insert part 19 of the spacer 18 and the inner periphery of the recess 13 is communicated with the clearance between the outer periphery of the loose-fit pin 14 of the mount 7 and the inner periphery of the pin loose-fitting part 22 of the spacer 18. A viscidity L made of a liquid such as a silicon of high viscosity (preferably, 100,000 cps or more) is filled in and lies between both the clearances. The recess 13 and the loose-fit pin 14 of the mount 7, the insert part 19 and the pin loose-fitting part 22 of the spacer 18, and the viscidity L in the clearances form a damper 23 for generating torque providing resistance to swing motion of the grip body 1.

The load acting on the grip body 1 of the assist grip G in passenger's use is distributed into three parts, i.e., the fulcrum pin 12 of the mount 7 fitted in the pin support 3 of the grip body 1, the opening 13a of the recess 13 of the mount 7 fitted on the sealed part 20 of the spacer 18 and the pivot pin 14a of the mount 7 fitted in the bore 22a of the spacer 18, and is then transmitted to the mount 7. This prevents breakage of the pin support 3 of the grip body 1 and the mount 7 and so on due to a concentrated load.

Alternatively, the load acting on the grip body 1 may not necessarily be distributed into the above-mentioned three parts in the mount 7, and may be distributed into two parts, i.e., the fulcrum pin 12 and the pivot pin 14a of the mount 7, or the fulcrum pin 12 and the opening 13a of the mount 7.

Figure 5:
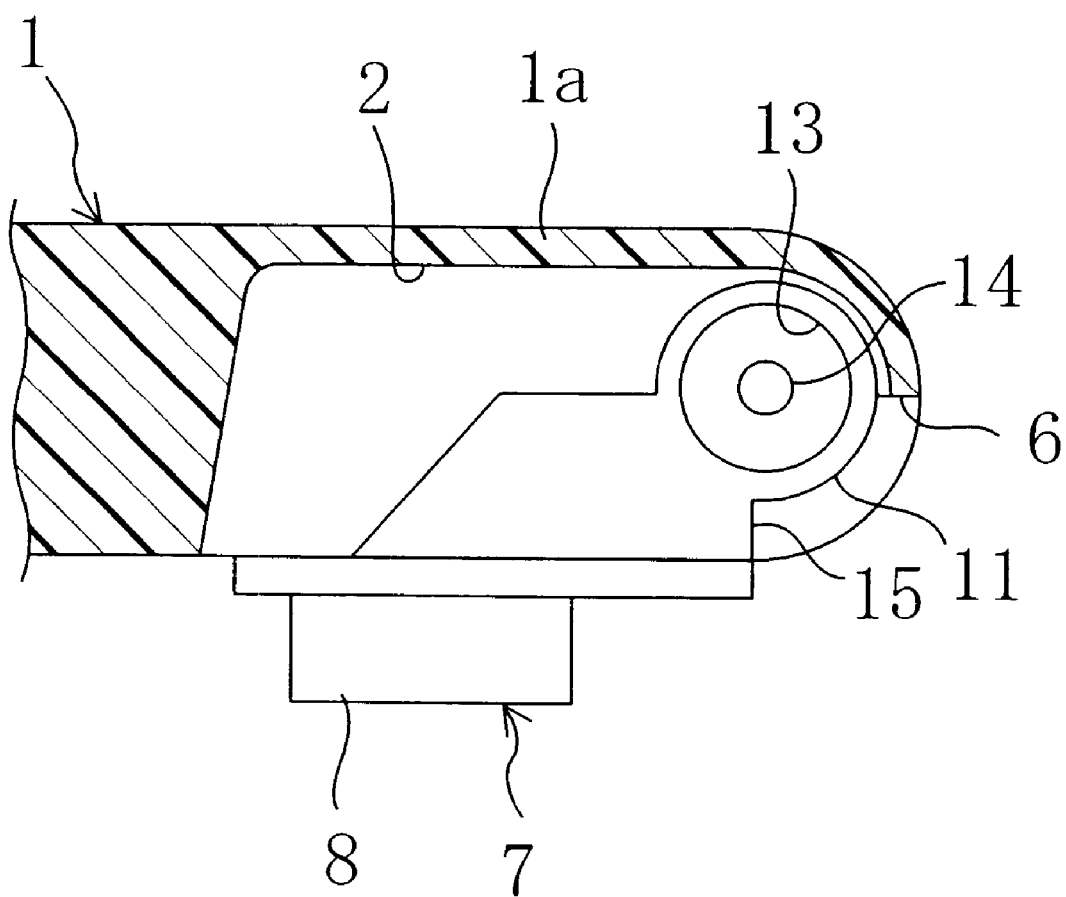
FIG. 5 is a cross-sectional view taken along the line V—V of FIG. 2.

As shown in FIG. 5, an abutment portion 6 is formed at the lower end of the opening of the accommodating section 2 in the leg 1a of the grip body 1, and the fixing part 8 of the mount 7 is formed with a stop 15 abuttable on the abutment portion 6. On swinging the grip body 1 from retracted to use position, the abutment portion 6 abuts on the stop 15 of the fixing part 8 of the mount 7 so that the grip body 1 is constrained to stop at the use position.

In assembling the assist grip G of this embodiment with the car body B, the torsion coil spring 16 is first disposed around the fulcrum pin 12. Then, both ends of the torsion coil spring 16 are anchored on the grip body 1 and the mount 7, respectively, while the end of the fulcrum pin 12 is inserted into the support bore 4 of the pin support 3 of the grip body 1. Subsequently, the spacer 18 is inserted into and fixed to the spacer fitting hole 5 of the leg 1a of the grip body 1 in a manner of inserting the insert part 19 thereof into the recess 13 of the mount 7 while loosely fitting the loose-fit pin 14 of the mount 7 into the pin loose-fitting part 22. Further, prior to the assembly of the spacer 18, a desired amount of viscidity L is filled into both the recess 13 of the mount 7 and the pin loose-fitting part 22 of the spacer 18. This allows the viscidity L to be encapsulated in the respective clearances created between the outer periphery of the insert part 19 of the spacer 18 and the inner periphery of the recess 13 and between the inner periphery of the pin loose-fitting part 22 of the spacer 18 and the outer periphery of the loose-fit pin 14 of the mount 7, concurrently with the assembly of the spacer 18.

The assist grip G, having been assembled with the mount 7 in the above manner, is assembled to the car body B by passing a screw S through the screw free-receiving hole 9 of the fixing part 8 of the mount 7 and fastening the mount 7 to the car body B through the screw S. Thereafter, the hinged type cover 10 is closed to cover the aperture of the fixing part 8 thereby hiding the screw S.

Accordingly, in the assist grip G of this embodiment, the grip body 1 is normally urged into swing motion to the retracted position and held in this position by a bias of the torsion coil spring 16. Then, when the passenger uses the assist grip G, he can grasp the grip body 1 and swing it to the use position against the bias of the torsion coil spring 16. Further, when the passenger stops the use of the assist grip G, if he simply releases the grip body 1, the grip body 1 automatically returns from use to retracted position while being swung by the bias of the torsion coil spring 16.

During the swing motion of the grip body 1 from use to retracted position (and also during the swing motion thereof from retracted to use position), the pin support 3 of the leg 1a of the grip body 1 rotates around the fulcrum pin 12 of the mount 7, and the spacer 18, mounted against rotation in the leg 1a of the grip body 1, rotates in the recess 13 of the mount 7. At the time, since the viscidity L lies in the clearance between the inner periphery of the recess 13 of the mount 7 and the outer periphery of the insert part 19 of the spacer 18, the viscosity of the viscidity L provides resistance (torque) to the rotation of the spacer 18 and the grip body 1. In addition, since the viscidity L also lies in the clearance between the inner periphery of the pin loose-fitting part 22 of the spacer 18 and the outer periphery of the loose-fit pin 14 of the mount 7, the viscosity of the viscidity L in this clearance also provides resistance to rotation. Such resistance at these locations causes the grip body 1 to swing slowly from use to retracted position. Accordingly, it is prevented that the grip body 1 hits the car body B hard to cause a beating sound. And, such slow swing motion provides an upscale image to the assist grip G.

Further, since the damper 23 is formed by filling the viscidity L into both the clearances between the inner periphery of the recess 13 of the mount 7 and the outer periphery of the insert part 19 of the spacer 18 and between the inner periphery of the pin loose-fitting part 22 of the spacer 18 and the outer periphery of the loose-fit pin 14, part of the damper 23 which provides rotational resistance is constructed in two layers of different diameters around the axis of rotation. Accordingly, the axial length of the damper 23 can be shortened as compared with a damper having part constructed in a single layer for providing rotational resistance.

Furthermore, the grip body 1 is supported to the mount 7 in such a manner that the pin support 3 of the leg 1a is journaled on the fulcrum pin 12 of the mount 7 and the spacer 18 is inserted into the recess 13 of the mount 7. Therefore, the assist grip G is built up from the grip body 1, the mount 7, the torsion coil spring 16 and the spacer 18 only. Accordingly, the number of components of the assist grip G can be reduced, resulting in cost reduction.

In addition, since the damper 23 is accommodated in the grip body 1, the appearance of the assist grip G can be improved.

Embodiment 2

FIGS. 12 through 19 show Embodiment 2 of the invention, wherein same components as those shown in FIGS. 1 through 11 are indicated by like reference characters and detailed description thereof will be omitted.

In this embodiment, each leg 1a of the grip body 1 in the retracted position is formed with an upper accommodating section 31, a lower accommodating section 32 located below the upper accommodating section 31 and far from the lateral center of the grip body 1, and a spacer fitting part 5 located below the upper accommodating section 31 and closer to the lateral center of the grip body 1. The lower accommodating section 32 and the spacer fitting part 5 are separated one from the other by a partition 33. The upper and lower accommodating sections 31, 32 are cavities formed by recessing the back face of the leg 1a. The spacer fitting part 5 is a circular hole formed by recessing the side surface of the leg 1a closer to the lateral center of the grip body 1 and tapering the recessed surface. The bottom of the spacer fitting part 5 is formed of the above-mentioned partition 33. The outer sidewall of the lower accommodating section 32 is formed into the pin support 3. The pin support 3 is formed at the inside surface with a bottomed support bore 4 of rectangular cross section coaxially with the spacer fitting part 5. The partition 33 has a pin tight-fitting hole 34 formed therethrough coaxially with the spacer fitting part 5.

Figure 12:
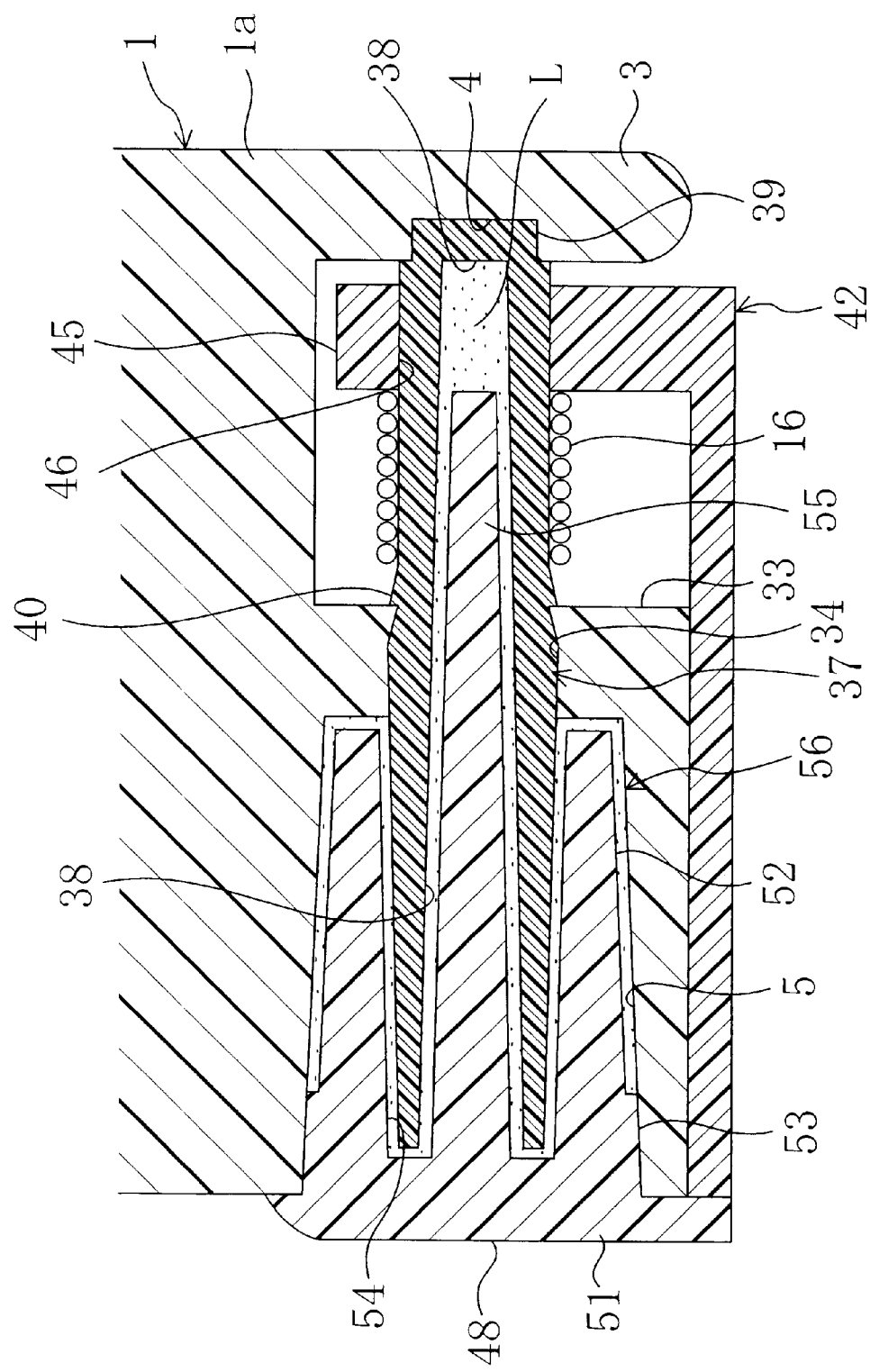
FIG. 12 is an enlarged cross-sectional view taken along the line XII—XII of FIG. 13.
Figure 13:
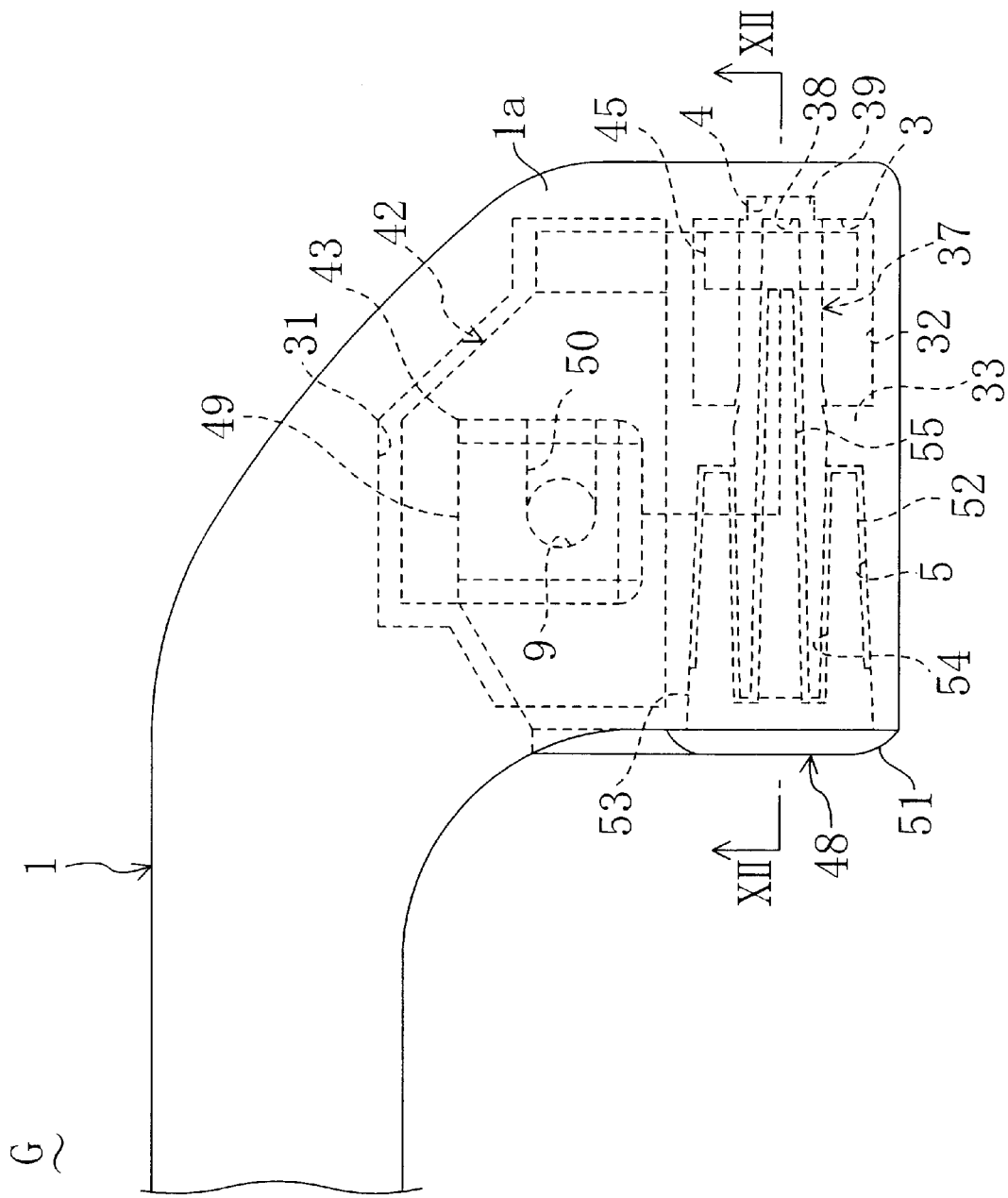
FIG. 13 is a diagram corresponding to FIG. 3, which shows an assist grip of Embodiment 2 of the present invention.
Figure 14:
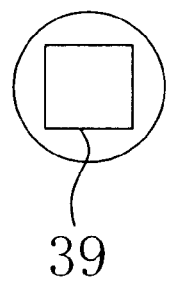
FIG. 14 is an enlarged side view of a fulcrum pin.
Figure 15:
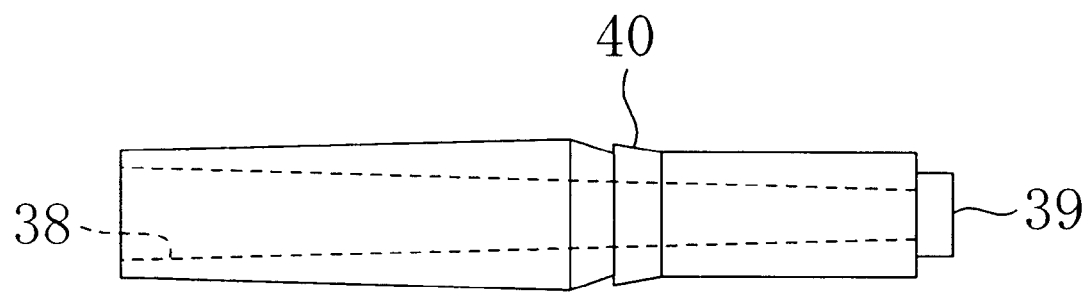
FIG. 15 is an enlarged front view of the fulcrum pin.

In order to pivotally mount the leg 1a of the grip body 1 on the car body B, a fulcrum pin 37 and first and second mounts 42, 48 are provided. As shown in FIGS. 14 and 15, the fulcrum pin 37 has a substantially cylindrical profile, and the outer periphery of the distal end portion thereof on the spacer fitting part 5 side is tapered toward the distal end. And, the fulcrum pin 37 has a bottomed axial hollow 38 opening into the distal end surface and tapered toward the root end of the fulcrum pin 37. On the other hand, the root end of the fulcrum pin 37 is formed integrally with a tight-fit part 39 of rectangular cross section, and the outer periphery thereof has a flange-shaped stop 40 extended therefrom. Further, as shown in FIG. 12, the tight-fit part 39 of the fulcrum pin 37 is tightly fitted against rotation into the support bore 4 of the pin support 3 of the grip body 1. The intermediate portion of the fulcrum pin 37 is fitted into the pin tight-fitting hole 34 in the partition 33 of the grip body 1 in liquid-tight manner, and the flange-shaped stop 40 on the outer periphery of the fulcrum pin 37 is engaged on the side surface of the partition 33 of the grip body 1. In this manner, the fulcrum pin 37 is fixedly assembled to the grip body 1 for unitary rotation and against axial movement. The spacer fitting part 5 of the grip body 1 is formed coaxially with the fulcrum pin 37, and the distal end portion of the fulcrum pin 37 extends to pass the inside of the spacer fitting part 5 toward its opening.

Figure 16:
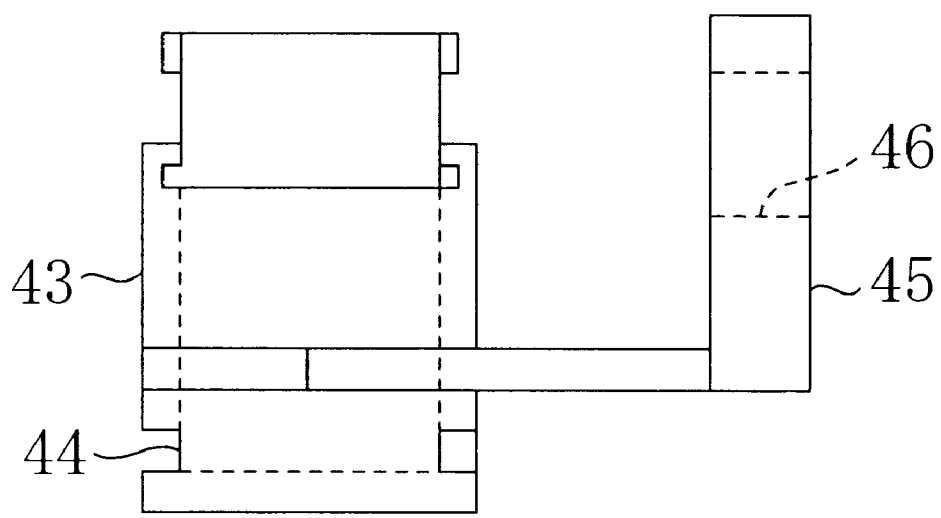
FIG. 16 is an enlarged plan view of a first mount.
Figure 17:
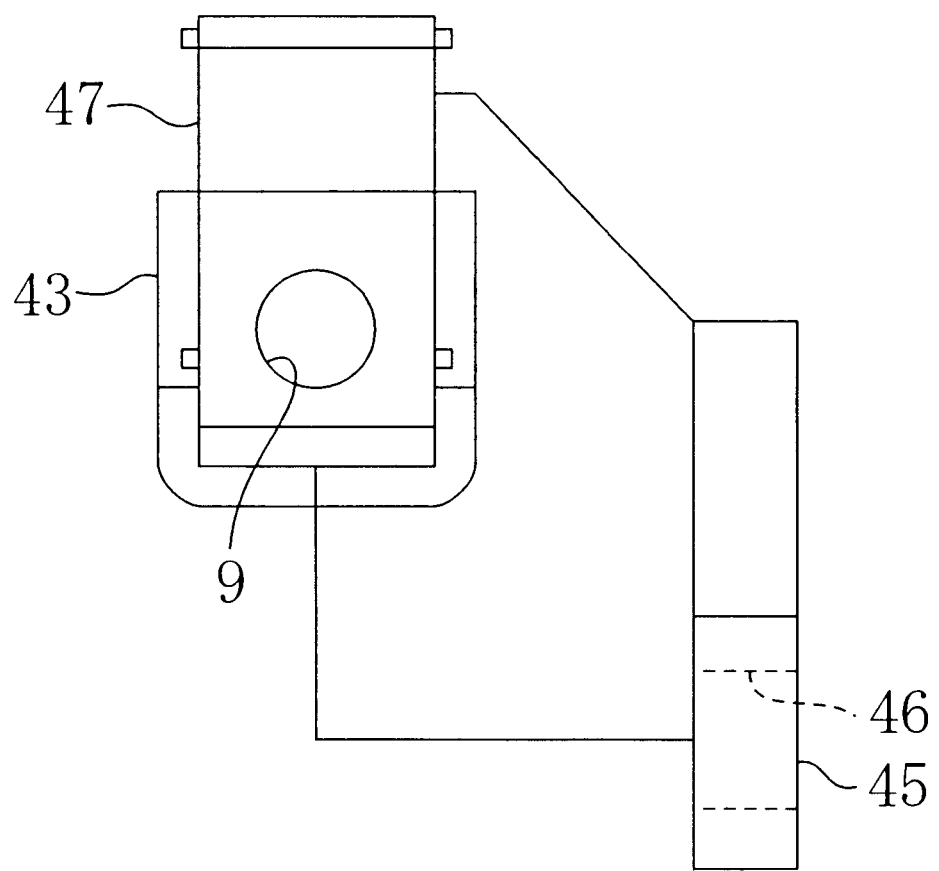
FIG. 17 is an enlarged front view of the first mount.

As shown in FIGS. 16 and 17, the first mount 42 has a fixing part 43 disposed and accommodated in the upper accommodating section 31 of the grip body 1. The fixing part 43 is provided with: a screw free-receiving hole 9 for freely receiving a screw (not shown) for fastening the first mount 42 to the car body B; and a hollow engaging part 44 of rectangular cross section, laterally formed through the fixing part 43, for engaging the below-described fixing part 49 (see FIGS. 13, 18 and 19) of the second mount 48.

At the front side of the fixing part 43, a bearing part 45 is integrally formed which extends rightwardly downward from the fixing part 43 to be disposed and accommodated in the lower accommodating section 32 of the grip body 1. The bearing part 45 has a pin loose-fitting hole 46 formed therethrough. Under this configuration, as shown in FIG. 12, the bearing part 45 of the first mount 42 is disposed in the lower accommodating section 32 of the grip body 1, and the fulcrum pin 37 is rotatably inserted into the pin loose-fitting hole 46 of the bearing part 45. In this manner, the grip body 1 is supported to the first mount 42, fixedly mounted on the car body B, for swing motion through the fulcrum pin 37.

Further, as shown in FIG. 12, a torsion coil spring 16 is carried about the fulcrum pin 37 between the partition 33 of the grip body 1 and the bearing part 45 of the first mount 42. Both ends of the spring 16 are anchored to the bearing part 45 and the partition 33, respectively. Under this configuration, the spring bias force of the torsion coil spring 16 urges the grip body 1 from use to retracted position.

Figure 18:
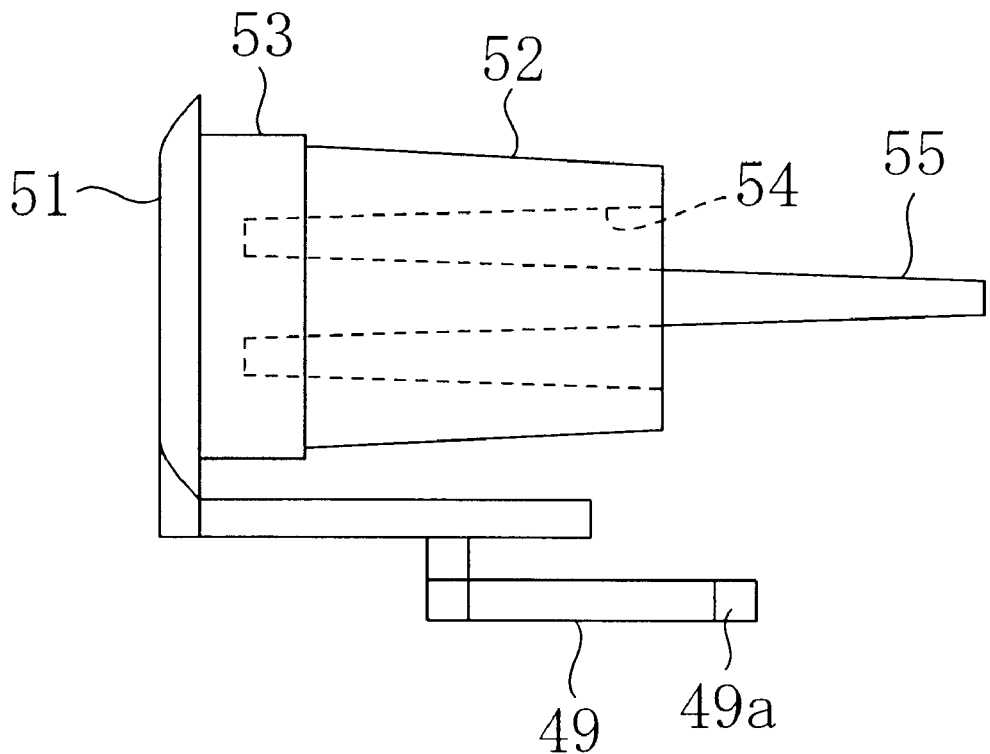
FIG. 18 is an enlarged plan view of a second mount.
Figure 19:
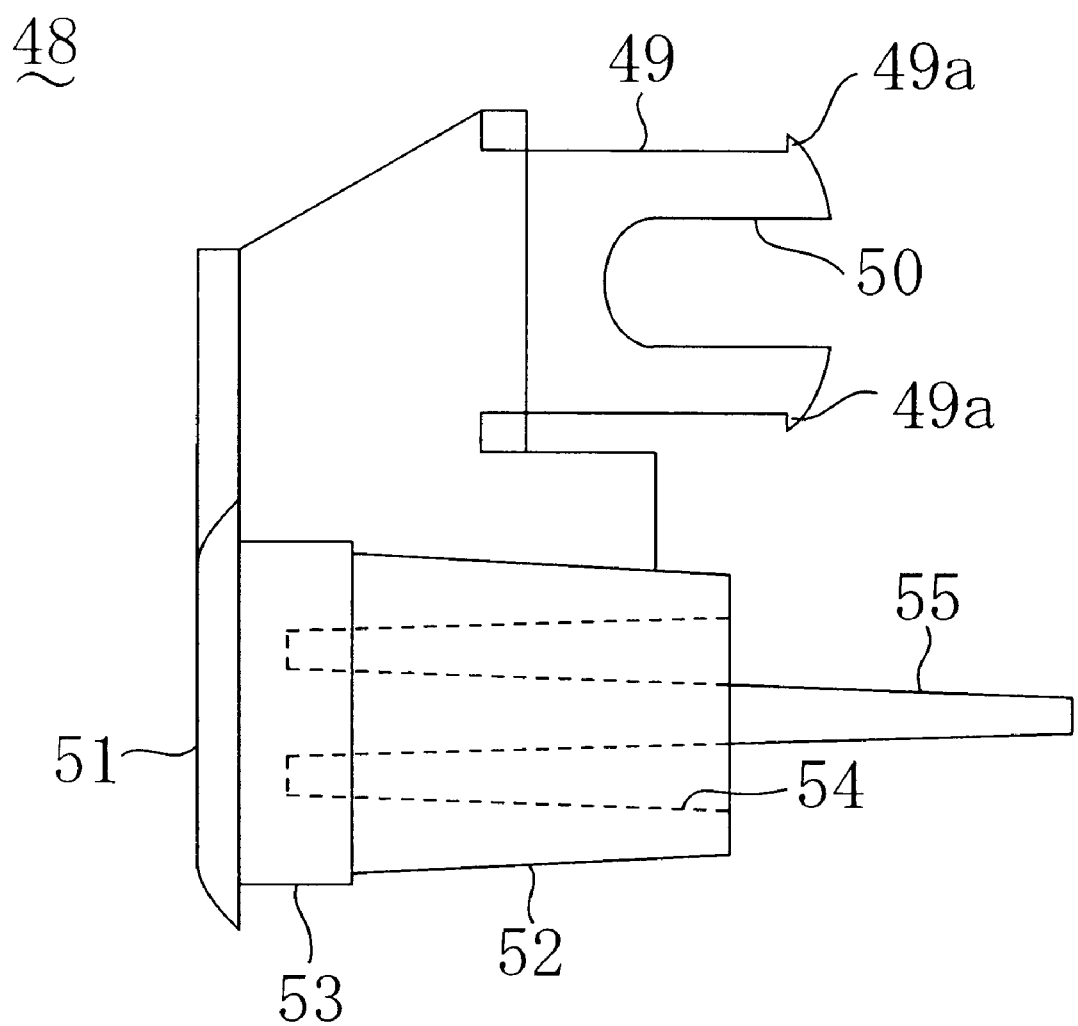
FIG. 19 is an enlarged front view of the second mount.

On the other hand, as shown in FIGS. 18 and 19, the second mount 48 includes a fixing part 49 disposed and accommodated in the upper accommodating section 31 of the grip body 1. Respective pawls 49a, 49a protrude from upper and lower side ends of the fixing part 49. The fixing part 49 is slidingly inserted into the engaging part 44 of the fixing part 43 of the first mount 42 to engage the engaging part 44 at the pawls 49a, 49a. This engagement between the fixing part 49 and the engaging part 44 causes the second mount 48 to be fixedly integrally engaged with the first mount 42. A reference numeral 50 denotes a notch formed to correspond to the screw free-receiving hole 9 of the first mount 42.

To the front side of the fixing part 49 of the second mount 48, a substantially cylindrical spacer part 51 is integrally connected which extends downwardly from the fixing part 49 to be disposed and accommodated in the spacer fitting part 5 of the grip body 1. One end portion of the spacer part 51 is composed of a tapered insert part 52 and a sealed part 53 extending radially outwardly from the insert part 52. As shown in FIG. 12, the insert part 52 of the spacer part 51 is inserted into the spacer fitting part 5 of the grip body 1 with a substantially uniform clearance created therebetween to allow rotation of the grip body 1. The sealed part 53 is fitted into the opening of the spacer fitting part 5 in liquid-tight manner. The sealed part 53 closes the opening of the spacer fitting part 5 so as to allow rotation relative to the opening, and seals the clearance between the outer periphery of the insert part 52 of the spacer part 51 and the inner periphery of the spacer fitting part 5, a clearance between the inner periphery of the below-described recess 54 and the outer periphery of the fulcrum pin 37, and a clearance between the outer periphery of the below-described loose-fit pin 55 and the inner periphery of the axial hollow 38 of the fulcrum pin 37. In FIG. 17, a reference numeral 47 denotes a cover similar to the cover 10 described in Embodiment 1.

Alternatively, if a sealing member such as an O-ring is interposed between the intermediate portion of the fulcrum pin 37 and the pin tight-fitting hole 34 of the partition 33 and/or between the opening of the spacer fitting part 5 and the sealed part 53 of the spacer part 51, the liquid-tight seal between these members can be further improved.

In the distal end surface of the spacer part 51 of the second mount 48, a recess 54 of a tapered hole diminishing its inner diameter toward the root end of the spacer part 51 (toward the bottom thereof) is formed coaxially with the outer periphery of the spacer part 51. A tapered loose-fit pin 55 is extended coaxially and integrally from the bottom of the recess 54 to pass the inside of the recess 54 toward an opening thereof. The loose-fit pin 55 extends beyond the opening of the recess 54. When the spacer part 51 is inserted into the spacer fitting part 5 of the grip body 1, the distal end portion of the fulcrum pin 37 is rotatably inserted into the recess 54 of the spacer part 51 with a substantially uniform clearance created therebetween, and the loose-fit pin 55 of the spacer part 51 is rotatably inserted into the axial hollow 38 of the fulcrum pin 37 with a substantially uniform clearance created therebetween.

The three clearances between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of he loose-fit pin 55 of the spacer part 51 and the inner periphery of the axial hollow 38 of the fulcrum pin 37, are communicated with each other. A viscidity L is filled in and lies between these clearances. The viscidity L in these three-layered clearances form a damper 56 for generating torque providing resistance to swing motion of the grip body 1.

In assembling the assist grip G of this embodiment with the car body B, the root end of the fulcrum pin 37 is first inserted into the pin tight-fitting hole 34 of the partition 33 through the spacer fitting part 5 of the grip body 1. Then, the root end of the fulcrum pin 37 passing through the pin tight-fitting hole 34 is inserted into the torsion coil spring 16 and the pin loose-fitting hole 46 of the bearing part 45 of the first mount 42. Thereafter, the tight-fit part 39 of the fulcrum pin 37 is fixedly fitted into the support bore 4 of the pin support 3 of the grip body 1, and the flange-shaped stop 40 on the outer periphery of the fulcrum pin 37 is engaged on the side surface of the partition 33 of the grip body 1. In this manner, the fulcrum pin 37 is fixedly assembled in unitary relation to the grip body 1.

Subsequently, a desired amount of viscidity L is filled into the recess 54 of the spacer part 51 of the second mount 48, into the spacer fitting part 5 of the grip body 1 and into the axial hollow 37 of the fulcrum pin 37. Then, the first and second mounts 42, 48 are unitarily set by engaging the fixing part 49 of the second mount 48 to the engaging part 44 of the first mount 42 while sliding the former in the latter, and the spacer part 51 of the second mount 48 is inserted into the spacer fitting part 5 of the grip body 1. Through this insertion, the distal end portion of the fulcrum pin 37 and the loose-fit pin 55 of the spacer part 51 are telescopically inserted into the recess 54 of the spacer part 51 and the axial hollow 38 of the fulcrum pin 37, respectively. Also, as a result of the above insertion, the viscidity L is encapsulated in the respective clearances created between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37.

The assist grip G, having been assembled with the first and second mounts 42, 48 in the above manner, is assembled to the car body by passing a screw through the screw free-receiving hole 9 of the fixing part 43 of the first mount 42 and fastening the first mount 42 to the car body through the screw. Thereafter, the hinged type cover 47 is closed to cover the aperture of the fixing part 43 thereby hiding the screw.

Accordingly, in this embodiment, the grip body 1 is shifted between its retracted position and use position while swinging relative to the bearing part 45 of the first mount 42 and the spacer part 51 of the second mount 48 in unitary relation to the fulcrum pin 37. At the time, the viscidity L lies in the respective clearances between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37. Therefore, for example, during the swing motion of the grip body 1 from use to retracted position, the viscosity of the viscidity L provides resistance to the swing motion of the grip body 1. Such resistance causes the grip body 1 to swing slowly from use to retracted position. Accordingly, it is prevented that the grip body 1 hits the car body hard to cause a beating sound. And, such slow swing motion provides an upscale image to the assist grip G.

Further, since the damper 56 is formed by filling the viscidity L into the respective clearances between the inner periphery of the spacer fitting part 5 of the grip body 1 and the outer periphery of the insert part 52 of the spacer part 51 of the second mount 48, between the inner periphery of the recess 54 of the spacer part 51 and the outer periphery of the fulcrum pin 37 and between the outer periphery of the loose-fit pin 55 of the spacer part 51 and the inner periphery of the axial hollow 38 of the fulcrum pin 37, part of the damper 56 which provides rotational resistance is constructed in three layers of different diameters around the axis of rotation. Accordingly, the axial length of the damper 56 can be further shortened than Embodiment 1.

Furthermore, the grip body 1 is supported to the two mounts 42, 48 through the fulcrum pin 37. Therefore, the assist grip G can be built up from the grip body 1, the fulcrum pin 37, the two mounts 42, 48 and the torsion coil spring 16 only. Accordingly, the number of components of the assist grip G can be reduced, resulting in cost reduction. In addition, since the damper 56 is accommodated in the grip body 1, the appearance of the assist grip G can be improved.

In the above embodiments, the retractable assist grips for vehicles are described as examples. However, the present invention is also applicable to assist grips for other purposes.

What is claimed is:

1. A retractable assist grip comprising:

a mount fixed to a fixed body;

a grip body pivotally mounted for swing motion at a leg thereof onto the mount; and urging means for urging the grip body into swing motion from its use position to its retracted position, wherein the mount includes a fulcrum pin extended integrally from one side thereof, a recess formed coaxially with the fulcrum pin on the opposite side of the mount, and a loose-fit pin extended integrally from the inner bottom toward the opening of the recess and coaxially with the fulcrum pin, the leg of the grip body is formed with a pin support journaled on the fulcrum pin, the leg of the grip body is assembled against relative rotation with a spacer rotatably inserted into the recess of the mount and including a pin loose-fitting part for loosely receiving the loose-fit pin therein, and a viscidity is provided between the outer periphery of the spacer and the inner periphery of the recess of the mount.

2. The retractable assist grip of claim 1, wherein the viscidity is also provided between the inner periphery of the pin loose-fitting part of the spacer and the outer periphery of the loose-fit pin of the mount.

3. A retractable assist grip comprising:

a mount fixed to a fixed body;

a grip body pivotally supported for swing motion to the mount; and urging means for urging the grip body into swing motion from its use position to its retracted position, wherein the mount is formed of first and second mounts, a leg of the grip body is assembled into unitary rotation with a fulcrum pin supported to the first mount, the grip body is formed with a spacer fitting part formed of a concavity coaxial with the fulcrum pin, the fulcrum pin extending inside the spacer fitting part toward the opening thereof, the second mount includes a spacer part rotatably fitted into the spacer fitting part and provided with a recess for loosely receiving the fulcrum pin extending inside the spacer fitting part therein, and a viscidity is provided at least between the outer periphery of the spacer part of the second mount and the inner periphery of the spacer fitting part of the grip body.

* * * * *

UNITED STATES PATENT AND TRADEMARK OFFICE
CERTIFICATE OF CORRECTION

PATENT NO. : 6,223,395 B1                                                                  Page 1 of 1
DATED : May 1, 2001
INVENTOR(S) : Sugumune Miho et al.

It is certified that error appears in the above-identified patent and that said Letters Patent is hereby corrected as shown below:

<u>Title page,</u>
Item [73] "Assignee", delete "Nishikawa Kasel" and insert -- Nishikawa Kasei --

Signed and Sealed this

Twenty-eighth Day of May, 2002

*Attest:*

*Attesting Officer*

JAMES E. ROGAN
*Director of the United States Patent and Trademark Office*